(12) United States Patent
Yang et al.

(10) Patent No.: US 6,325,490 B1
(45) Date of Patent: Dec. 4, 2001

(54) NOZZLE PLATE WITH MIXED SELF-ASSEMBLED MONOLAYER

(75) Inventors: Zhihao Yang, Webster; Thomas L. Penner; Ravi Sharma, both of Fairport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/224,533

(22) Filed: Dec. 31, 1998

(51) Int. Cl.$^7$ ........................................... B41J 2/135
(52) U.S. Cl. .................. 347/45; 347/47; 347/44; 347/100
(58) Field of Search ................. 347/45, 100, 44, 347/47

(56) References Cited

U.S. PATENT DOCUMENTS

| | | | |
|---|---|---|---|
| 4,643,948 | 2/1987 | Diaz et al. | |
| 4,961,785 * | 10/1990 | Skene et al. | 106/31.43 |
| 5,108,504 * | 4/1992 | Johnson et al. | 347/100 |
| 5,136,310 | 8/1992 | Drews . | |
| 5,598,193 * | 1/1997 | Halko et al. | 347/45 |
| 6,074,040 * | 6/2000 | Usui et al. | 347/45 |

\* cited by examiner

*Primary Examiner*—John Barlow
*Assistant Examiner*—Manish S. Shah
(74) *Attorney, Agent, or Firm*—Andrew J. Anderson

(57) ABSTRACT

An ink jet nozzle plate is provided comprising an outer surface having a self-assembled monolayer thereon comprising a mixture of at least one hydrophobic compound and at least one ionic compound, which monolayer renders the outer surface non-wetting with respect to aqueous ink solutions. In accordance with preferred embodiments, the self-assembled monolayers comprises a mixture of hydrophobic alkyl thiols and charged alkyl thiols. An advantage of coatings in accordance with the invention is that they provide improved non-wetting characteristics after contact with ink.

23 Claims, 1 Drawing Sheet

NOZZLE PLATE WITH MIXED SELF-ASSEMBLED MONOLAYER

FIELD OF THE INVENTION

This invention relates to ink jet printing and, more particularly, to ink jet nozzle plates in ink jet print heads modified by deposition of a self-assembled monolayer comprising mixtures of hydrophobic and ionic molecules.

BACKGROUND OF THE INVENTION

An ink jet printer produces images on a receiver by ejecting ink droplets onto the receiver in an imagewise fashion. The advantages of non-impact, low-noise, low energy use, and low cost operation in addition to the capability of the printer to print on plain paper are largely responsible for the wide acceptance of ink jet printers in the marketplace.

In this regard, "continuous" ink jet printers utilize electrostatic charging tunnels that are placed close to the point where ink droplets are being ejected in the form of a stream. Selected ones of the droplets are electrically charged by the charging tunnels. The charged droplets are deflected downstream by the presence of deflector plates that have a predetermined electric potential difference between them. A gutter may be used to intercept the charged droplets, while the uncharged droplets are free to strike the recording medium.

In the case of "on demand" ink jet printers, at every orifice a pressurization actuator is used to produce the ink jet droplet. In this regards either one of two types of actuators may be used. These two types of actuators are heat actuators and piezoelectric actuators. With respect to heat actuators, a heater placed at a convenient location heats the ink and a quantity of the ink will phase change into a gaseous steam bubble and raise the internal ink pressure sufficiently for an ink droplet to be expelled to the recording medium. With respect to piezoelectric actuators. A piezoelectric material is used, which piezoelectric material possess piezoelectric properties such that an electric field is produced when a mechanical stress is applied. The converse also holds true; that is, an applied electric field will produce a mechanical stress in the material. Some naturally occurring materials possessing these characteristics are quartz and tourmaline. The most commonly produced piezoelectric ceramics are lead zirconate titanate, barium titanate, lead titanate, and lead metaniobate.

A continuing problem with ink jet printers is the accumulation of ink on ink jet nozzle plates, particularly around the orifice from which ink drops are ejected. The result of ink drops accumulating on the nozzle plate surface around the orifice is that it becomes wettable causing ink drops to be misdirected, degrading the quality of the printed image. To limit or prevent the spreading of ink from the orifice to the nozzle plate, it is common practice to coat the ink jet nozzle plate with an anti-wetting layer. Examples of anti-wetting layers are coatings of hydrophobic polymer materials such as Teflon and polyimide-siloxane, or a monomolecular layer (self-assembled monolayer) of a material that chemically binds to the nozzle plate. Self assembled monolayers of alkyl thiols, alkyl trichlorosilanes and partially fluorinated alkyl silanes have previously been disclosed in the patent literature for the treatment of inkjet nozzle plates (see, e.g., U.S. Pat. Nos. 4,643,948, 5,136,310, and 5,598,193).

Ink jet nozzle plates are also contaminated by ink drops that land on the nozzle plate. These "satellite ink" drops are created as a by-product of the drop separation process of the primary ink drop that is used to print. Another source of contaminating ink are tiny ink drops created when the primary ink drop impacts recording material. Where the whole nozzle plate surface has been treated with a non-wetting layer, such additional ink drops will bead-up for easy removal. Ink drops accumulating on nozzle plates can also potentially attract dirt such as paper fibers, however, which cause the nozzles to become blocked. Partially or completely blocked nozzles can lead to missing or misdirected drops on the print media, either of which degrades the quality of the print. The particulate debris thus needs to be cleaned from the surface and orifice to restore proper droplet formation.

In order to solve this problem, the nozzle plates are periodically cleaned. This cleaning is commonly accomplished by brushing, wiping, spraying, vacuum suction, and/or spitting of ink through the orifices. Several wiping methods are known including wet wiping techniques utilizing inks and ink solvents used to dilute inks as a cleaning solvent. Even with the presence of hydrophobic non-wetting surfaces, inks often contain various materials which may leave an undesirable residue on the ink jet print head nozzle plate. Thus while wiping removes ink drops from the nozzle plate, the hydrophobic non-wetting coating may be severely contaminated and compromised by ink residue. Such resulting "ink-fouled" coatings may subsequently be unable to effectively prevent the spreading of the ink firm the orifices.

It has been discovered, e.g., that hydrophobic coatings on ink jet print head nozzle plates are susceptible to fouling by certain ink jet inks, such as those containing copper phthalocyanine dyes. U.S. Pat. Nos. 4,643,948 and 5,589,193, e.g., relate to modification of an ink jet nozzle plate with organic hydrophobic materials. U.S. Pat. No. 5,589,193 in particular discloses the use of non-polar and polar alkyl thiols to produce non-wetting or wetting layers, respectively, and discloses that such compounds may be either ionic or nonionic. However, there is a problem in that the non-wetting layers containing organic hydrophobic materials disclosed therein have been found to be prone to ink-fouling upon contact with copper phthalocyanine ink jet ink. The fouling of the nozzle plate by the ink can lead to excessive spreading by ink onto the nozzle plate during normal use, further aggravating drop placement problems. The lone specific ionic compound (Compound No. 9) disclosed in U.S. Pat. No. 5,589,193 is described as the "most wetting", and there is no suggestion to use such compound as a component in a non-wetting layer.

There remains a need for a simple, economical ink jet nozzle plate with a reduced propensity to foul upon contact with inks. The preferred coating should render anti-wetting and anti-ink-fouling characters to ink jet nozzle plates so that an ink jet print head will consistently deliver accurate and reproducible drops of ink to a receiver resulting in photographic quality images.

SUMMARY OF THE INVENTION

An object of this invention is to provide a method for treating an ink jet print head nozzle plate with a hydrophobic coating that inhibits ink-fouling. This method comprises applying self-assembled monolayers that are hydrophobic and anti-ink-fouling to an ink jet nozzle plate. In accordance with one embodiment of the invention, an ink jet nozzle plate is provided comprising an outer surface having a self-assembled monolayer thereon comprising a mixture of at least one hydrophobic compound and at least one ionic compound, which monolayer renders the outer surface non-wetting with respect to aqueous ink solutions. In accordance with preferred embodiments, the self-assembled monolayers comprises a mixture of hydrophobic alkyl thiols and charged alkyl thiols. An advantage of coatings in accordance with the invention is that they provide improved non-wetting characteristics after contact with ink. Another advantage is that because the coatings are not compromised after contact with ink, they do not need to be cleaned using specially formulated cleaning solutions which may be environmentally hazardous. Yet another advantage is the reduced cost of maintaining the anti-wetting character of the print head.

DETAILED DESCRIPTION OF THE PREFERRED EMBODIMENTS

Figure 1:
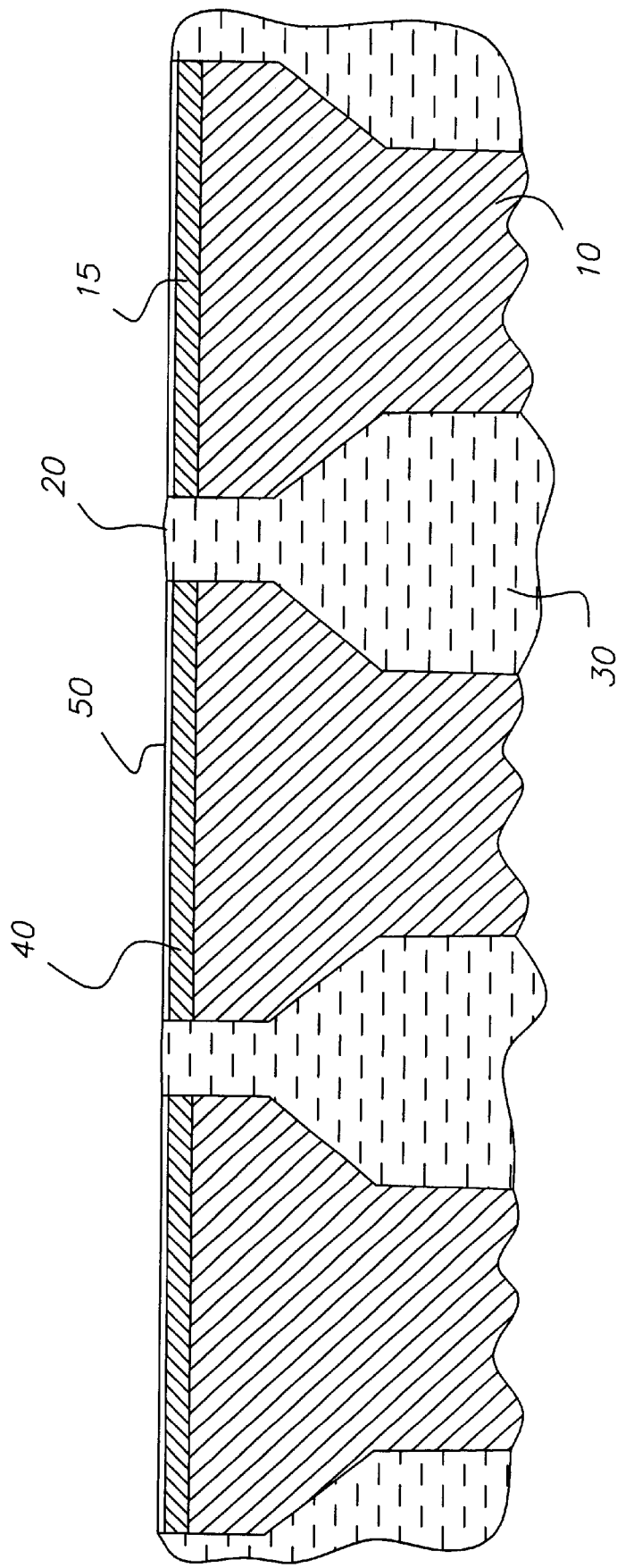
FIG. 1 is a diagram showing a cross-sectional view of a portion of a nozzle plate that is formed in accordance with the present invention.

As shown in FIG. 1, the present invention includes a nozzle plate 10 for a conventional ink jet print head. The nozzle plate 10 preferably comprises a silicon wafer 15 constructed by conventional etching techniques, and which is preferably coated with a gold layer 40 by, for example, sputtering methods. The silicon wafer 15 may have an oxide or nitride coating. It should be appreciated that other materials beside silicon wafer, such as electro-formed nickel, may be used to form the underlying nozzle plate as is known in the art. Further other metals such as silver, palladium and copper may be used to coat the underlying nozzle plate material. The plate includes an array of orifices 20, through which ink 30 is ejected. A self-assembled monolayer 50 of the present invention is prepared on the gold coating 40.

The wetting character of surface of the ink jet nozzle plate is conventionally defined by the size of the contact angle between an ink drop and the test surface. Contact angles are conventionally measured by placing a 1–2 mm diameter liquid drop on a test surface and measuring the angle between the liquid and solid using a contact angle goniometer. A surface is considered non-wetting if the contact angle between the ink and the surface is approximately 70° or greater. It has been discovered, however, that while non-wetting is an important characteristic for nozzle plate coating, it is not sufficient for determining its actual performance during practical use. This is because it has been found that originally hydrophobic non-wetting coatings may become no longer non-wetting (i.e., contact angles may become less than 70°) after they have been contaminated by contact with some ink jet inks, such as copper phthalocyanine ink jet inks. The degradation in the non-wetting character of the coating is termed ink-fouling, and coatings resistant to ink-fouling in accordance with the invention are called anti-ink-fouling surfaces.

In accordance with the present invention, there is provided a method for treating an ink jet print head nozzle plate with a hydrophobic coating that inhibits ink-fouling. This method comprises applying self-assembled monolayers that are non-ink-wetting and anti-ink-fouling to an ink jet nozzle plate. The self-assembled monolayers comprise a mixture of hydrophobic compounds and ionic compounds. It is a unique feature of the invention that the presence of ionic compounds in the mixed monolayers provide good anti-ink-fouling performance to monolayer nozzle plate surfaces, and that even with substantial levels of ionic compounds combined with hydrophobic compounds monolayers are formed which maintain good non-wetting characteristics.

As shown in FIG. 1, a gold surface 40 of the nozzle plate 10 has been modified by depositing a self-assembled monolayer 50 for improving the non-wetting and anti-ink-fouling character of the nozzle plate. Preferably, the entire gold surface 40 of the nozzle plate 10 is made non-wetting and anti-ink-fouling. This can be accomplished by simply immersing the nozzle plate in an ethanol solution containing 0.1–10 mM of hydrophobic compound and 0.1–10 mM charged ionic compound. Residual solution adhering to the nozzle plate upon retrieving the nozzle plate from the ethanol solution may be easily removed by application of pressurized gas such as nitrogen. Alternatively, a solution containing the monolayer components may be sprayed or stamped on the nozzle plate. The mixing ratio for the monolayer hydrophobic and ionic compounds can range from about 0.1 to 0.8 in mole fraction of the ionic compounds, preferably from 0.5 to 0.7 in mole fraction of the ionic compounds.

In preferred embodiments of the invention, the hydrophobic compounds are alkyl thiol compounds with a hydrophobic moiety and may be represented by the formula R—SH, wherein R represents a substituted or unsubstituted alkyl or arylalkyl group preferably having from about 6 to about 30 carbon atoms or a fluoroalkyl or arylfluoroalkyl group preferably having from about 2 to about 30 carbon atoms, such as hexyl, hexadecyl, myristyl, lauryl, oleyl, dodecylbenzene, fluorobutyl, fluorohexyl, phenylperfluorohexyl, partially fluorinated alkyl groups, etc., and the ionic compounds are ionic alkyl thiol compounds that may be represented by the formula XR'—SH, wherein R' represents a substituted or unsubstituted alkyl or arylalkyl group preferably having from 1 to about 30 carbon atoms or a fluoroalkyl or arylfluoroalkyl group preferably having from about 2 to about 30 carbon atoms, such as hexyl, hexadecyl, myristyl, lauryl, oleyl, dodecylbenzene, fluorobutyl, fluorohexyl, phenylperfluorohexyl, partially fluorinated alkyl groups, etc., and X represents a charged group or an acid or salt thereof. In accordance with particularly preferred embodiments, X represents a negatively charged ionic group such as but not limited to a carboxylate, sulfonate, sulfate, phosphonate, phosphate, phenolate, boronate, or borate group, or an acid or salt thereof. Specific preferred examples of ionic compounds for use in the present invention include mercaptopropionic acid and mercaptoethylene sulfonic acid sodium salt.

In accordance with a preferred embodiment of the invention, the ionic compound employed in the non-wetting monolayer comprises an anionic group to provide effective anti-ink-fouling protection to ink jet inks comprising anionic dyes such as a sulfonated copper phthalocyanine dye. The use of cationic compounds in non-wetting monolayers in accordance with the invention to provide anti-ink-fouling protection to ink jet inks comprising cationic dyes is also specifically contemplated.

Chemical compounds which can be used to form the mixed monolayers are not limited to the specific examples provided herein. In place of the thiol compounds, e.g., disulfide, sulfinate or selenolate compounds with alkyl, fluoroalkyl, or charged alkyl chains as well as polymers with negatively charged functional groups and thiol, disulfide, sulfinate or selenolate groups could be used. In addition, an alkyl silane mixed with a silane carying a charged group can be used to coat the silicon oxide or silicon nitride surface without a gold coating on the nozzle.

The invention will be further illustrated in the following examples:

EXAMPLE 1

Coatings of self-assembled monolayers comprising a mixture of a hydrophobic compound (hexadecane thiol (HDT)) and an ionic compound (either mercaptopropionic acid (MPA) or mercaptoethylene sulfonic acid sodium salt (MES)) in accordance with the invention on a gold coated silicon wafer nozzle plate material were prepared in the following manner: 100 nm of gold was deposited on a silicon wafer pre-coated with 5nm of chromium deposited by vapor deposition. The chromium is deposited to promote adhesion of the gold to the underlying nozzle plate material. The silicon wafer was treated with 1% hydrofluoric acid solution prior to the chromium and gold coating. The gold-coated nozzle plate material has a root-mean-square roughness of 1.5–2.0 nm, characterized by atomic force microscopy. Pieces of gold-coated nozzle plate were placed in ethanolic solutions of HDT/MPA or HDT/MES mixtures. The total thiol concentration of the mixtures was about 5 mM. The relative molar concentrations of the components are listed in Table 1. The samples were removed from the ethanolic HDT/MPA or HDT/MES solutions after 24 hours, and then washed thoroughly with ethanol and water and dried in a stream of filtered nitrogen.

Contact angles of the coated surfaces with water and an aqueous copper phthalocyanine ink solution were measured and are reported in Table 1. The water-based copper phthalocyanine ink was composed of 2 wt % copper phthalocyanine tetrasulfonic acid tetrasodium (Acros Organics) and 10 wt % ethylene glycol (Aldrich Chemical Co., Inc.). This ink is representative of soluble dye-based inks that use copper phthalocynines.

The HDT/MPA and HDT/MES coated nozzle plates were also tested for ink-fouling as follows: The self-assembled monolayer coated surfaces were immersed in an ink solution (2% copper phthalocyanine tetrasulfonic acid tetrasodium and 10% ethylene glycol in aqueous solution, pH 4.1) for 5 minutes, followed by a 30 second brief rinse of surfaces with water. After a blow dry of the surfaces with $N_2$, the contact angles of the surface with water were measured, and are also reported in Table 1.

TABLE 1

| Monolayer Hydrophobic/Ionic Compound Ratio | Contact Angle with Water (degree) | Contact Angle with Copper Phthalocyanine Ink (degree) | Contact Angle with Water after Ink Staining (degree) |
|---|---|---|---|
| HDT alone | 104 | 95 | 45 |
| HDT/MES 0.55/0.45 | 93 | 89 | 56 |
| HDT/MPA 0.55/0.45 | 100 | 90 | 49 |
| HDT/MPA 0.45/0.55 | 101 | 87 | 74 |
| HDT/MPA 0.35/0.65 | 90 | 88 | 73 |

The above results show that the mixed self-assembled monolayers remain non-wetting to water for all the compositions tested (up to 0.65 mole fraction of the ionic polar alkyl thiol, MPA). In addition the contact angle of copper phthalocyanine ink is also close to 90°, and therefore the mixed HDT/MPA and HDT/MES layers are practically non-wetting to copper phthalocyanine ink as well. Compared with the values before ink staining, a significant ink fouling is found for the pure HDT monolayer, as a significantly lower contact angles with water is obtained after ink staining. Addition of a low level of ionic compound (0.45 mole fraction) results in an improvement as indicated by the higher contact angle after ink staining, and the presence of greater than 50% ionic compound MPA in the monolayer results in significant reduction in ink fouling on the surface. This example illustrates that mixed self-assembled monolayers comprising an ionic compound applied to ink jet printer nozzle plate material in accordance with the invention can render the surface of the nozzle plate non-wetting to ink and also anti-ink-fouling.

Comparison self-assembled monolayer coatings comprising a mixture of a hydrophobic non-polar compound (hexadecane thiol (HDT)) and a nonionic polar compound (11-mercapto-1-undecanol (MU(OH))) as suggested in U.S. Pat. No. 5,598,193 were similarly coated as above on a gold coated silicon wafer nozzle plate material, and similarly tested for contact angles before and after ink staining. The results are reported in Table 2:

TABLE 2

| HDT/MU(OH) Ratio | Contact Angle with Water (degree) | Contact Angle with Copper Phthalocyanine Ink (degree) | Contact Angle with Water after Ink Staining (degree) |
|---|---|---|---|
| 0.53/0.47 | 102 | 91 | 45 |
| 0.43/0.57 | 99 | 91 | 41 |

The above results show that while the comparison mixed self-assembled monolayers initially are non-wetting to water and to copper phthalocyanine ink, compared with the values before ink staining, addition of a low level of nonionic polar compound (i.e., less than 50%) does not result in any reduction in ink fouling, and the presence of greater than 50% nonionic polar compound in the monolayer actually results in a higher level of in ink fouling on the surface as indicated by the lower contact angle.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet nozzle plate comprising an outer surface having a self-assembled monolayer thereon comprising a mixture of at least one hydrophobic compound and at least one ionic compound, which monolayer renders the outer surface non-wetting with respect to aqueous ink solutions.

2. An ink jet nozzle plate of claim 1 where the at least one hydrophobic compound comprises an alkyl thiol and the at least one ionic compound comprises an ionic alkyl thiol.

3. An ink jet nozzle plate of claim 2 where the self-assembled monolayer is formed using a mixture of compounds comprising a hydrophobic alkyl thiol having the structure R—SH wherein R represents a substituted or unsubstituted alkyl or arylalkyl group having from about 6 to about 30 carbon atoms or a fluoroalkyl or arylfluoroalkyl group having from about 2 to about 30 carbon atoms, and an ionic alkyl thiol having the structure XR'—SH, wherein R' represents a substituted or unsubstituted alkyl or arylalkyl group having from 1 to about 30 carbon atoms or a fluoroalkyl or arylfluoroalkyl group having from about 2 to about 30 carbon atoms, and X represents a charged group or acid or salt thereof.

4. An ink jet nozzle plate of claim 3 where R and R' each independently represent a hexyl, hexadecyl, myristyl, lauryl, oleyl, dodecylbenzene, fluorobutyl, fluorohexyl, phenylperfluorohexyl, or partially fluorinated alkyl group, and X represents a carboxylate, sulfonate, sulfate, phosphonate, phosphate, phenolate, boronate, or borate group or acid or salt thereof.

5. An ink jet nozzle plate of claim 3 where X represents a carboxylate, sulfonate, sulfate, phosphonate, phosphate, phenolate, boronate, or borate group or acid or salt thereof.

6. An ink jet nozzle plate of claim 1 where the self-assembled monolayer comprises a mixture of hexadecane thiol and mercaptopropionic acid.

7. An ink jet nozzle plate of claim 6 where the self-assembled monolayer is prepared from a mixture of hexadecane thiol and mercaptopropionate with mole fraction 0.5–0.7 of mercaptopropionate.

8. An ink jet nozzle plate of claim 1 where the self-assembled monolayer comprises a mixture of hexadecane thiol and mercaptoethylene sulfonate.

9. An ink jet nozzle plate of claim 8 where the self-assembled monolayer is prepared from a mixture of hexadecane thiol and mercaptoethylene sulfonate with mole fraction 0.5–0.7 of mercaptoethylene sulfonate.

10. An ink jet nozzle plate of claim 1 where the self-assembled monolayer is prepared from a mixture of hydrophobic alkyl thiol and ionic alkyl thiol with mole fraction 0.1–0.8 of ionic alkyl thiol.

11. An ink jet nozzle plate of claim 1 where the self-assembled monolayer is prepared from a mixture of hydrophobic alkyl thiol and ionic alkyl thiol with mole fraction 0.5–0.7 of ionic alkyl thiol.

12. An ink jet nozzle plate comprising an outer surface having a self-assembled monolayer thereon comprising a mixture of at least one hydrophobic compound and at least one ionic compound, which monolayer renders the outer surface non-wetting with respect to aqueous ink solutions, where the ionic compound comprises an anionic alkyl thiol.

13. An ink jet nozzle plate of claim 12 where the self-assembled monolayer is prepared from a mixture hydrophobic alkyl thiol and anionic alkyl thiol with mole fraction 0.1–0.8 of anionic alkyl thiol.

14. An ink jet nozzle plate of claim 12 where the self-assembled monolayer is prepared from a mixture hydrophobic alkyl thiol and anionic alkyl thiol with mole fraction 0.5–0.7 of ionic alkyl thiol.

15. A process of making an image with an ink jet printer comprising ejecting ink droplets through an ink jet nozzle plate onto a receiver medium in an imagewise fashion, wherein the ink droplets comprise an aqueous ink solution which comprises anionic dye and the ink jet nozzle plate comprises an outer surface having a self-assembled monolayer thereon comprising a mixture of at least one hydrophobic compound and at least one anionic compound, which monolayer renders the outer surface non-wetting with respect to the aqueous ink solution.

16. A process of claim 15 where the self-assembled monolayer is prepared from a mixture of hydrophobic alkyl thiol and anionic alkyl thiol with mole fraction 0.1–0.8 of anionic alkyl thiol.

17. A process of claim 15 where the self-assembled monolayer is prepared from a mixture of hydrophobic alkyl thiol and anionic alkyl thiol with mole fraction 0.5–0.7 of ionic alkyl thiol.

18. A process of claim 15 where the self-assembled monolayer is formed using a mixture of compounds comprising a hydrophobic alkyl thiol having the structure R—SH wherein R represents a substituted or unsubstituted alkyl or arylalkyl group having from about 6 to about 30 carbon atoms or a fluoroalkyl or arylfluoroalkyl group having from about 2 to about 30 carbon atoms, and an anionic alkyl thiol having the structure XR'—SH, wherein R' represents a substituted or unsubstituted alkyl or arylalkyl group having from 1 to about 30 carbon atoms or a fluoroalkyl or arylfluoroalkyl group having from about 2 to about 30 carbon atoms, and X represents an anionic group or salt or acid thereof.

19. A process of claim 18 where R and R' each independently represent a hexyl, hexadecyl, myristyl, lauryl, oleyl, dodecylbenzene, fluorobutyl, fluorohexyl, phenylperfluorohexyl, or partially fluorinated alkyl group, and X represents a carboxylate, sulfonate, sulfate, phosphonate, phosphate, phenolate, boronate, or borate group or acid or salt thereof.

20. A process of claim 18 where X represents a carboxylate, sulfonate, sulfate, phosphonate, phosphate, phenolate, boronate, or borate group or acid or salt thereof.

21. A process of claim 18 where the self-assembled monolayer comprises a mixture of hexadecane thiol and mercaptopropionic acid.

22. A process of claim 18 where the self-assembled monolayer comprises a mixture of hexadecane thiol and mercaptoethylene sulfonate.

23. A process of claim 15 where the aqueous ink solution comprises a sulfonated copper phthalocyanine dye.

* * * * *